US012695138B2

(12) United States Patent
Kister et al.

(10) Patent No.: US 12,695,138 B2
(45) Date of Patent: Jul. 28, 2026

(54) CONTROLLING TEMPERATURE OF INDIVIDUAL ELECTROCHEMICAL CELL DURING TESTING

(71) Applicant: Atieva, Inc., Newark, CA (US)

(72) Inventors: Jason Kister, Livermore, CA (US); Benjamin Miller Horst, San Jose, CA (US); Harrison Senor, Newark, CA (US)

(73) Assignee: Atieva, Inc., Newark, CA (US)

( * ) Notice: Subject to any disclaimer, the term of this patent is extended or adjusted under 35 U.S.C. 154(b) by 616 days.

(21) Appl. No.: 18/185,116

(22) Filed: Mar. 16, 2023

(65) Prior Publication Data

US 2023/0299388 A1 Sep. 21, 2023

Related U.S. Application Data

(60) Provisional application No. 63/269,488, filed on Mar. 17, 2022.

(51) Int. Cl.
| | |
|---|---|
| *H01M 10/50* | (2006.01) |
| *H01M 10/42* | (2006.01) |
| *H01M 10/44* | (2006.01) |
| *H01M 10/48* | (2006.01) |
| *H01M 10/637* | (2014.01) |
| *H01M 10/643* | (2014.01) |
| *H01M 10/647* | (2014.01) |
| *H01M 10/653* | (2014.01) |
| *H01M 10/6572* | (2014.01) |

(52) U.S. Cl.
CPC ... *H01M 10/6572* (2015.04); *H01M 10/4285* (2013.01); *H01M 10/44* (2013.01); *H01M 10/486* (2013.01); *H01M 10/637* (2015.04);

*H01M 10/643* (2015.04); *H01M 10/647* (2015.04); *H01M 10/653* (2015.04); *H01M 2200/106* (2013.01)

(58) Field of Classification Search
CPC ........... H01M 10/6572; H01M 10/657; H01M 10/637; H01M 10/655; H01M 10/643; H01M 10/647; H01M 10/653; H01M 10/4285; H01M 10/44; H01M 10/486; H01M 2200/106
See application file for complete search history.

(56) References Cited

U.S. PATENT DOCUMENTS

| | | | |
|---|---|---|---|
| 8,435,668 B2 | 5/2013 | Kumar et al. | |
| 8,642,203 B2 | 2/2014 | Joswig et al. | |
| 10,018,681 B2 | 7/2018 | Tsuruta | |
| 10,305,154 B2 * | 5/2019 | Kim ................. | H01M 10/6568 |

(Continued)

OTHER PUBLICATIONS

International Search Report and Written Opinion for PCT Application No. PCT/US2023/064557, mailed on Jun. 23, 2023, 12 pages.

*Primary Examiner* — Raymond Alejandro
(74) *Attorney, Agent, or Firm* — Brake Hughes Bellermann LLP

(57) ABSTRACT

An apparatus comprises: a clamshell configured for holding an electrochemical cell having first and second terminals, the clamshell comprising at least first and second portions hinged to each other; first and second contacts positioned for contacting the first and second terminals, respectively; and a thermoelectric device mounted to the clamshell for controlling a temperature of the electrochemical cell.

18 Claims, 13 Drawing Sheets

(56)        References Cited

U.S. PATENT DOCUMENTS

| 10,340,562 B2 * | 7/2019 | Kimura ................... B60L 50/64 |
| 2015/0042284 A1 * | 2/2015 | Murata ................... B60L 58/13 |
| | | 320/126 |
| 2019/0273289 A1 | 9/2019 | Hahn et al. |
| 2020/0398652 A1 | 12/2020 | Stephens et al. |

* cited by examiner

CONTROLLING TEMPERATURE OF INDIVIDUAL ELECTROCHEMICAL CELL DURING TESTING

CROSS-REFERENCE TO RELATED APPLICATION

This application claims priority to U.S. Patent Application No. 63/269,488, filed on Mar. 17, 2022, and entitled "CONTROLLING TEMPERATURE OF INDIVIDUAL ELECTROCHEMICAL CELL DURING TESTING," the disclosure of which is incorporated by reference herein in its entirety.

TECHNICAL FIELD

This document relates to controlling the temperature of an individual cell during testing.

BACKGROUND

In recent years, the world's transportation has begun a transition away from powertrains primarily driven by fossil fuels and toward more sustainable energy sources, chiefly among them electric motors powered by on-board energy storages. Such energy storages (e.g., battery packs) can be based on a collection of electrochemical cells. Electrochemical cells are subjected to various testing procedures during product development and the manufacturing process. In current approaches, cells are often manually moved from one environmental chamber to another in order to expose the cells to specified thermal conditions, which is time-consuming, not easily scalable, and may lead to inconsistent airflow across the individual cells. As such, the ambient temperatures, cooling power, and collected data may vary significantly between the cells that are tested at the same time. The range of test conditions that can be applied may be limited in such non-automated processes.

SUMMARY

In a first aspect, an apparatus comprises: a clamshell configured for holding an electrochemical cell having first and second terminals, the clamshell comprising at least first and second portions hinged to each other; first and second contacts positioned for contacting the first and second terminals, respectively; and a thermoelectric device mounted to the clamshell for controlling a temperature of the electrochemical cell.

Implementations can include any or all of the following features. A form factor of the electrochemical cell is a cylinder shape or a prismatic shape. The thermoelectric device is configured for operating according to Peltier effect. At least one of the first and second contacts includes a spring-loaded pin, the spring-loaded pin configured to be moveable relative to a remainder of the one of the first and second contacts for electrically contacting a terminal of the electrochemical cell. At least one of the first and second contacts is spring mounted relative to the electrochemical cell such that the one of the first and second contacts is moveable relative to the electrochemical cell. Both the first and second contacts are spring mounted relative to the electrochemical cell. The apparatus further comprises a thermal pad of a dielectric material inside the clamshell, the thermal pad facing the electrochemical cell. The apparatus further comprises a polymer film on a surface of the thermal pad, the polymer film positioned so that the electrochemical cell touches the polymer film, and does not touch the thermal pad, when positioned inside the clamshell. The apparatus further comprises a latch on the clamshell, the latch configured for selectively keeping the first and second portions of the clamshell in a closed position. The apparatus further comprises a positive thermal coefficient device positioned to detect temperature inside at least one of the first and second portions of the clamshell. The positive thermal coefficient device is configured for detecting a safety cutoff temperature of the electrochemical cell. The positive thermal coefficient device is configured for detecting a testing temperature of the electrochemical cell.

In a second aspect, a system comprises: a frame having an interior channel for coolant; and an apparatus mounted to the frame, the apparatus comprising: a clamshell configured for holding an electrochemical cell having first and second terminals, the clamshell comprising at least first and second portions hinged to each other; first and second contacts positioned for contacting the first and second terminals, respectively; and a thermoelectric device mounted to the clamshell for controlling a temperature of the electrochemical cell.

The system can further comprise a thermal pad positioned between the apparatus and the frame. The frame comprises an extrusion with an interior channel. At least one fin faces inward in the interior channel. The thermoelectric device is positioned between and abuts the clamshell and the extrusion. The frame further comprises an upright, wherein the extrusion is coupled to the upright, and wherein a coolant passage is formed between the extrusion and the upright, the coolant passage facilitating flow of coolant into and out of the interior channel of the extrusion. The system further comprises a fitting mounted to the frame that facilitates flow into or out of the frame, the fitting including a coolant path member configured to fit inside an O-ring fitting.

In a third aspect, a method comprises: placing an electrochemical cell having first and second terminals in a clamshell, the clamshell comprising (i) at least first and second portions hinged to each other, and (ii) first and second contacts positioned for contacting the first and second terminals, respectively; performing at least one of a charging sequence or a discharging sequence on the electrochemical cell in the clamshell; and during the charging sequence or the discharging sequence, controlling a temperature of the electrochemical cell using a thermoelectric device mounted to the clamshell.

Implementations can include any or all of the following features. The method further comprises detecting a temperature inside at least one of the first and second portions of the clamshell using a positive thermal coefficient device. The detected temperature is a safety cutoff temperature of the electrochemical cell. The detected temperature is a testing temperature of the electrochemical cell. The method further comprises changing the temperature of the electrochemical cell using the thermoelectric device based on detecting the temperature.

BRIEF DESCRIPTION OF DRAWINGS

Like reference symbols in the various drawings indicate like elements.

DETAILED DESCRIPTION

Figure 1:
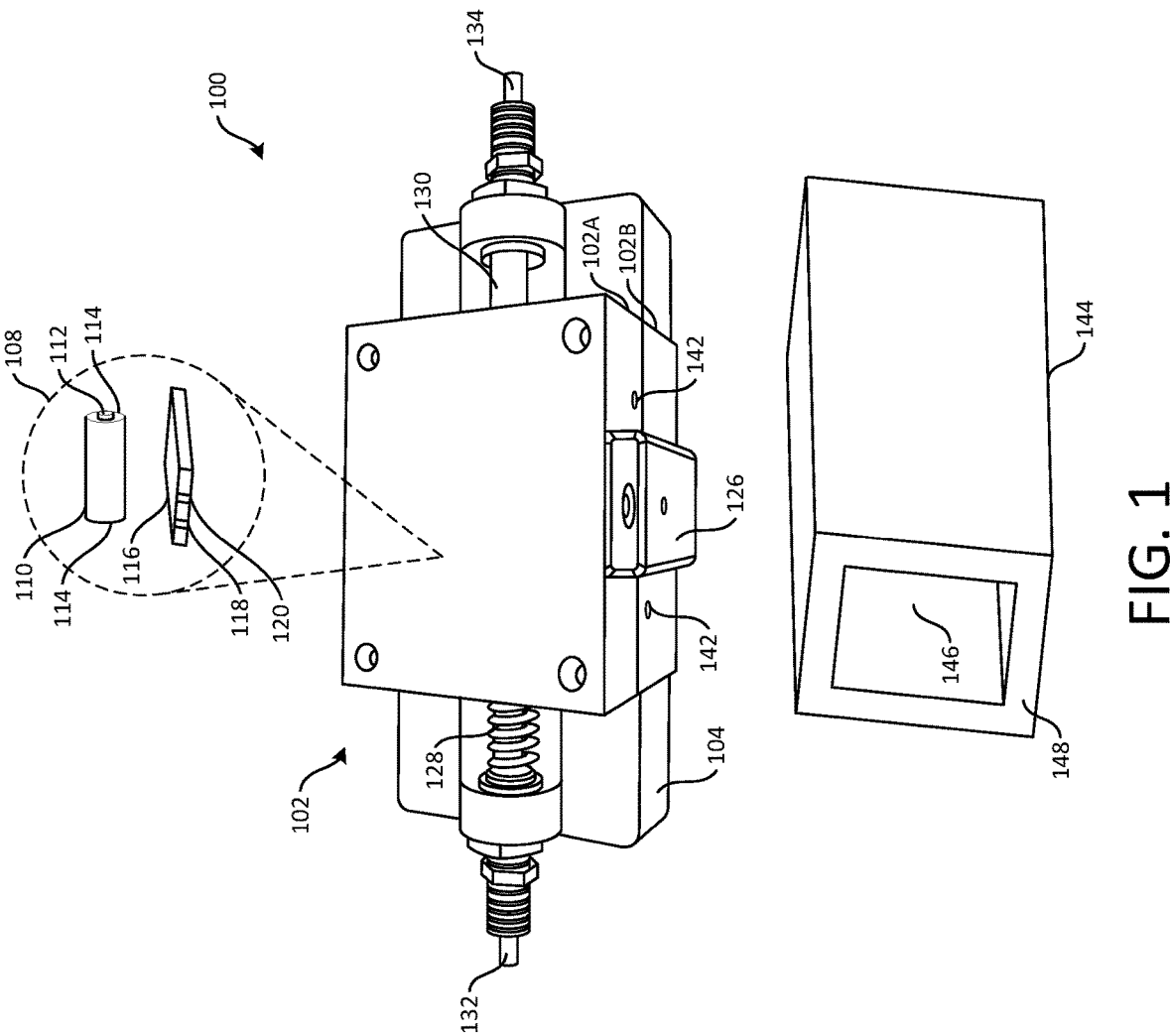
FIG. 1 schematically shows an example of an apparatus for controlling a temperature of an electrochemical cell.

This document describes examples of systems and techniques for individually controlling a temperature of an electrochemical cell. This can allow systems or techniques to provide the ability to test electrochemical cells in a dedicated thermally controlled environment for each individual cell in a scalable system. Consistent cell testing data can be provided across all channels. In some implementations, the cell temperature can be controlled during one or more phases of a testing protocol for the electrochemical cell. For example, temperature can be controlled and monitored during at least one of a charging sequence or a discharging sequence. Each electrochemical cell can be enclosed within a clamshell during the testing, and a thermoelectric device can be mounted to the clamshell for controlling a temperature of the electrochemical cell. The electrochemical cell can be electrically coupled to a power source (e.g., to perform a charging sequence) or to a load (e.g., to perform a discharging sequence) as part of the testing. One or more clamshells (e.g., an entire batch that is being processed at the same time) can be positioned in thermal connection with a frame or other structure for purposes of thermal control (e.g., to remove heat from a thermoelectric device in order to bring a clamshell, and thereby a cell, to a lower temperature).

Examples herein refer to electrochemical cells. As used herein, an electrochemical cell is a device that generates electrical energy from chemical reactions, or uses electrical energy to cause chemical reactions, or both. An electrochemical cell can include an electrolyte and two electrodes to store energy and deliver it when used. In some implementations, the electrochemical cell can be a rechargeable cell. For example, the electrochemical cell can be a lithium-ion cell. In some implementations, the electrochemical cell can act as a galvanic cell when being discharged, and as an electrolytic cell when being charged. The electrochemical cell can have at least one terminal for each of the electrodes. The terminals, or at least a portion thereof, can be positioned at one end of the electrolytic cell. For example, when the electrochemical cell has a cylindrical shape, one of the terminals can be provided in the center of the end of the cell, and the can that forms the cylinder can constitute the other terminal and therefore be present at the end as well. Other shapes of electrochemical cells can be used, including, but not limited to, prismatic shapes.

Examples herein refer to testing of an electrochemical cell. As used herein, testing includes thermal exposure sequences that may be performed as part of a manufacturing process for the electrochemical cell, or that may be performed in connection with assembling multiple electrochemical cells into a battery module. For example, a manufacturer of electrochemical cells may perform thermal testing of the electrochemical cells, using the present subject matter, before shipping electrochemical cells to a customer that will ultimately place one or more of the electrochemical cells into an apparatus (e.g., a battery module). As another example, the customer of such electrochemical cells may perform thermal testing of the electrochemical cells, using the present subject matter, before assembling the apparatus (whether or not the cell manufacturer has previously performed testing).

Examples herein refer to a battery module, which is an individual component configured for holding and managing multiple electrochemical cells during charging, storage, and use. The battery module can be intended as the sole power source for one or more loads (e.g., electric motors), or more than one battery module of the same or different type can be used. Two or more battery modules can be implemented in a system separately or as part of a larger energy storage unit. For example, a battery pack can include two or more battery modules of the same or different type. A battery module can include control circuitry for managing the charging, storage, and/or use of electrical energy in the electrochemical cells, or the battery module can be controlled by an external component. For example, a battery management system can be implemented on one or more circuit boards (e.g., a printed circuit board).

Examples herein refer to a top or a bottom, a front or a rear. These and similar expressions identify things or aspects in a relative way based on an express or arbitrary notion of perspective. That is, these terms are illustrative only, used for purposes of explanation, and do not necessarily indicate the only possible position, direction, and so on.

Figure 2:
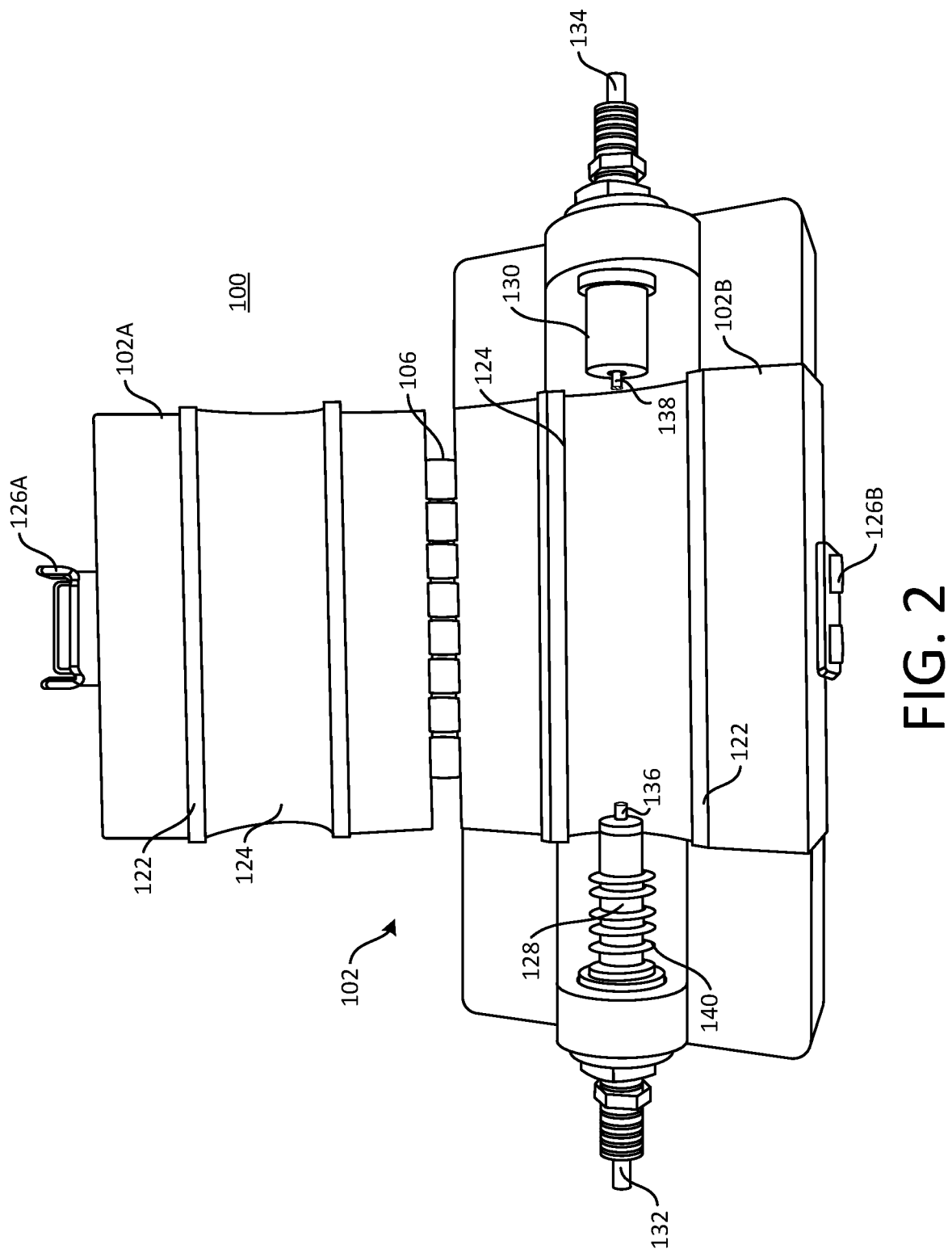
FIG. 2 shows an example of the apparatus of FIG. 1 with the clamshell in an open position.

FIG. 1 schematically shows an example of an apparatus 100 for controlling a temperature of an electrochemical cell. FIG. 2 shows an example of the apparatus 100 of FIG. 1 with a clamshell 102 in an open position. The apparatus 100 can be used with one or more other examples described elsewhere herein.

The apparatus 100 can include the clamshell 102 and a fixture 104. The fixture 104 can be designed so as to accommodate (e.g., hold in place) the clamshell 102. In some implementations, the clamshell 102 is made of a material with relatively good thermal conductivity (e.g., metal, including, but not limited to, aluminum) and the fixture 104 is made of a synthetic material (e.g., a polymer) or a metal. The clamshell 102 can be designed so as to wrap around a part of the fixture 104.

The clamshell 102 can include at least portions 102A-102B hinged to each other. In some implementations, a hinge 106 can include a barrel hinge (e.g., with at least one barrel and at least one pin). In some implementations, the hinge 106 can include a flexible material to facilitate relative motion between the portions 102A-102B.

The clamshell 102 can accommodate (e.g., clamp or wrap around, or otherwise envelop) an electrochemical cell that is to be subjected to thermal testing, conditioning, or other treatment. The electrochemical cell can have any of multiple form factors, as here schematically illustrated by separately showing part of an interior 108 of the clamshell 102. In some implementations, the apparatus can use an electrochemical cell 110 having a cylinder shape with at least a terminal 112 (e.g., a center terminal at the end of the cell), and a terminal 114 (e.g., a housing terminal that may be located at the edge of the end of the cell where the terminal 112 is situated). For example, the terminal 112 can be a positive terminal and the terminal 114 can be a negative terminal. In some implementations, the apparatus can use an electrochemical cell 116 having a prismatic shape with at least a terminal 118 and a terminal 120. For example, a prismatic shape can include, but is not limited to, a rectilinear shape (e.g., an essentially rectangular-shaped box). Other form factors can be used.

The apparatus 100 can include a thermal pad 122 of a dielectric material inside the clamshell 102. The portion 102A can include a part of the thermal pad 122 and the portion 102B can include another part of the thermal pad 122. In some implementations, the (portions of the) thermal pad 122 can be positioned inside the clamshell 102 so as to face, e.g., at least partially envelop, the electrochemical cell. This can ensure an even and efficient heat transfer between the electrochemical cell and the clamshell 102. For example, here the thermal pad 122 includes a partial cylindrical surface positioned against the portion 102A so as to face an interior of the clamshell 102. As another example, here the thermal pad 122 includes a partial cylindrical surface positioned against the portion 102B so as to face an interior of the clamshell 102. The thermal pad 122 can prevent electrical contact between the electrochemical cell and the clamshell 102. The shape of the areas of the clamshell 102 that hold the electrochemical cell can be designed with a shape corresponding to the form factor(s) of the electrochemical cell(s) to be used with the clamshell.

The apparatus 100 can include a polymer film 124 inside the clamshell 102. The portion 102A can include a part of the polymer film 124 and the portion 102B can include another part of the polymer film 124. In some implementations, the (portions of the) polymer film 124 can be positioned inside the clamshell 102 so as to face, e.g., at least partially envelop, the electrochemical cell. This can ensure that the electrochemical cell does not directly touch another part of the apparatus 100 (including, but not limited to, the thermal pad 122). For example, here the polymer film 124 includes a partial cylindrical surface positioned relative to the portion 102A so as to face an interior of the clamshell 102. As another example, here the polymer film 124 includes a partial cylindrical surface positioned relative to the portion 102B so as to face an interior of the clamshell 102.

The apparatus 100 can include a latch 126 that is configured for selectively keeping the portions 102A-102B of the clamshell 102 in a closed position. In some implementations, the latch 126 can include a latch portion 126A that is positioned on the portion 102A of the clamshell 102 and configured to selectively engage with a latch portion 126B that is positioned on the portion 102B for keeping the clamshell 102 closed.

The apparatus 100 can include contacts 128 and 130 extending from the fixture 104 for contacting respective terminals of the electrochemical cell. The contact 128 can have a terminal 132 that is distal to the clamshell 102. In some implementations, the terminal 132 can be used for connecting the apparatus 100 to a power source and/or a load for testing the electrochemical cell. For example, the terminal 132 can contact one of the terminals 112, 114, 118, or 120. The contact 130 can have a terminal 134 that is distal to the clamshell 102. In some implementations, the terminal 134 can be used for connecting the apparatus 100 to a power source and/or a load for testing the electrochemical cell. For example, the terminal 134 can contact another one of the terminals 112, 114, 118, or 120 than the terminal 132.

One or more of the contacts 128 or 130 can include a spring-mounted feature. In some implementations, the contact 128 includes a spring-loaded pin 136. The spring-loaded pin 136 can have a smaller (e.g., significantly smaller) dimension than a remainder of the contact 128. The spring-loaded pin 136 can extend axially with a remainder of the contact 128 in a direction proximate (e.g., towards) the electrochemical cell. For example, spring-loaded pin 136 can include a pogo pin (e.g., a plunger that is biased by a spring for limited moveability inside a barrel). The spring-loaded pin 136 is configured to be moveable relative to a remainder of the contact 128 for electrically contacting a terminal of the electrochemical cell. In some implementations, the contact 130 includes a spring-loaded pin 138. The spring-loaded pin 138 can have a smaller (e.g., significantly smaller) dimension than a remainder of the contact 130. The spring-loaded pin 138 can extend axially with a remainder of the contact 130 in a direction proximate (e.g., towards) the electrochemical cell. For example, spring-loaded pin 138 can include a pogo pin (e.g., a plunger that is biased by a spring for limited moveability inside a barrel). The spring-loaded pin 138 is configured to be moveable relative to a remainder of the contact 130 for electrically contacting a terminal of the electrochemical cell. The spring-loaded pins 136 and 138 can accommodate electrochemical cells of different axial length to be used with that apparatus 100, and/or can ensure that electric contact is not lost upon minor movement of the electrochemical cell.

One or more of the contacts 128 or 130 can be spring mounted relative to the electrochemical cell such that the contact 128 or 130 is moveable relative to the electrochemical cell. In some implementations, the contact 128 includes a spring 140 that allows a remainder of the contact 128 to be moved relative to the fixture 104. The spring 140 can accommodate electrochemical cells of different axial length to be used with that apparatus 100, and/or can ensure that electric contact is not lost upon minor movement of the electrochemical cell. The contact 130 can be solidly or rigidly mounted to the fixture 104.

The apparatus 100 includes a thermoelectric device (not shown) mounted to the clamshell 102 for controlling a temperature of the clamshell and thereby the electrochemical cell. The thermoelectric device can be positioned toward a rear side of the apparatus 100 with regard to the present illustration. The thermoelectric device can be controlled to provide cooling or heating of the electrochemical cell. In some implementations, the thermoelectric device can include an electrified junction between two different conductors (e.g., a thermocouple). For example, the thermoelectric device can operate according to the Peltier effect to either cool or heat the electrochemical cell.

The apparatus 100 includes a positive thermal coefficient (PTC) device 142 positioned to detect temperature inside at least one of the portions 102A or 102B of the clamshell 102. In some implementations, the PTC device 142 is configured for detecting a safety cutoff temperature of the electrochemical cell. For example, the PTC device 142 can trigger a shutdown of the testing equipment if the temperature of the electrochemical cell becomes too high. In some implementations, the PTC device 142 is configured for detecting a testing temperature of the electrochemical cell. For example, the PTC device 142 can continuously output the present temperature of the clamshell 102 and such output(s) can be used in monitoring, controlling, and/or recording the testing of the electrochemical cell.

The above examples illustrate that an apparatus (e.g., the apparatus 100) can include a clamshell (e.g., the clamshell 102) configured for holding an electrochemical cell (e.g., the electrochemical cell 110 or 116) having first and second terminals (e.g., the terminals 112, 114, 118, or 120). The clamshell can include at least first and second portions (e.g., the portions 102A or 102B) hinged to each other (e.g., by the hinge 106). The apparatus can include first and second contacts (e.g., the contacts 128 and 130) positioned for contacting the first and second terminals, respectively. The apparatus can include a thermoelectric device mounted to the clamshell for controlling a temperature of the clamshell, and thereby of the electrochemical cell.

The apparatus 100 can be used for thermally controlling an individual electrochemical cell. The apparatus 100 can be mounted to a structure designed to remove heat from the apparatus 100 (e.g., to remove heat from a thermoelectric device thereof). Here, a frame 144 is schematically represented adjacent the apparatus 100. The frame 144 can be made of metal (e.g., extruded aluminum) and has at least one interior channel 146 for coolant that is here visible because the frame 144 has been truncated so that a profile 148 is visible. The interior channel 146 can have any shape (including, but not limited to, a rectilinear shape or a circular shape). The profile 148 can have any shape (including, but not limited to, a rectilinear shape or a circular shape). The frame 144 can have any length. For example, one or more of the apparatus 100 can be mounted to (e.g., abutting) the frame 144. The coolant flowing through the interior channel(s) 146 can remove heat from the apparatus 100. One or more batches of electrochemical cells can be mounted to the frame 144 to perform testing. A modular setup can allow separate tests for different test conditions to be simultaneously performed on respective ones of the cells.

Figure 3:
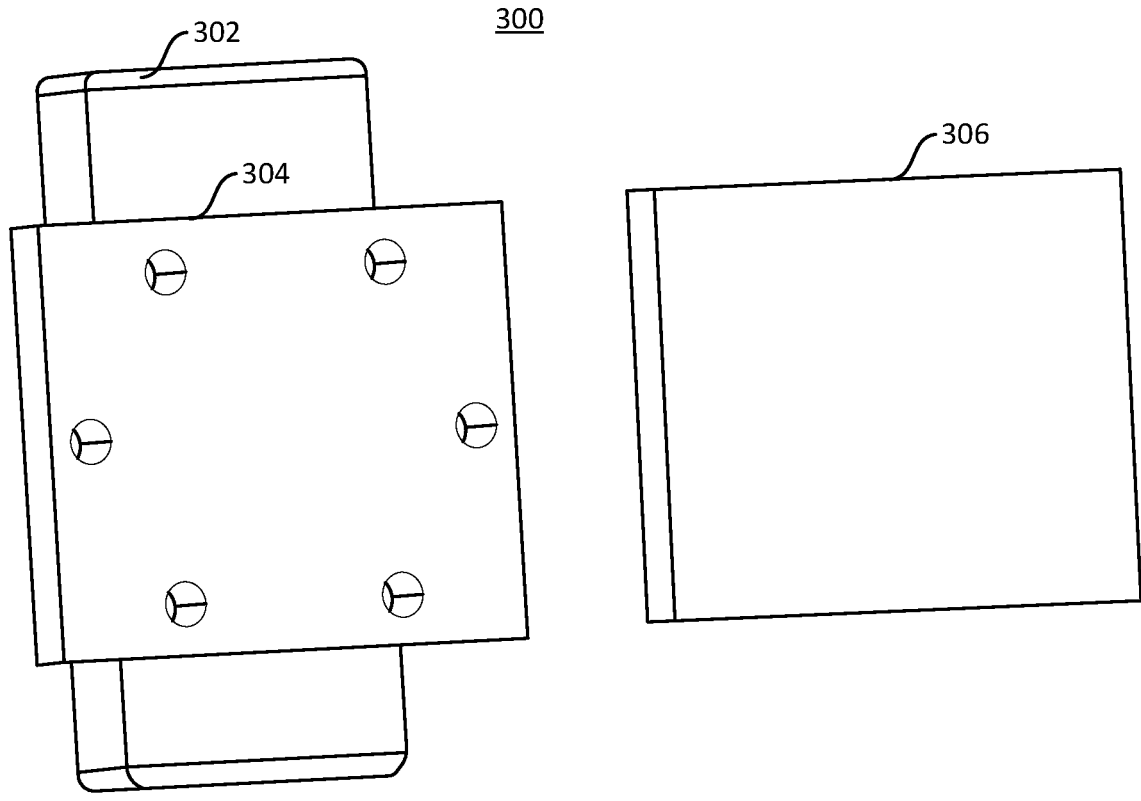
FIG. 3 shows an example of a rear side of a fixture that can be part of the apparatus of FIG. 1.

FIG. 3 shows an example of a rear side of a fixture 300 that can be part of the apparatus 100 of FIG. 1. The fixture 300 can be used with one or more other examples described elsewhere herein. For example, the fixture 300 can be part of, or used instead of, the fixture 104 in FIG. 1. The fixture 300 includes a fixture bed 302 and a plate 304. The fixture bed 302 may be configured for holding a clamshell (e.g., the clamshell 102 of FIG. 1) so that the clamshell is at an opposite side of the fixture bed 302 from the plate 304. In some implementations, the plate 304 can be referred to as a "back plate" of the fixture 300. For example, the plate 304 can facilitate mounting of the fixture 300 (and a rest of an apparatus for testing an individual electrochemical cell) against a frame having an interior channel for coolant (e.g., the frame 144 in FIG. 1). A thermal pad 306 can be positioned against the plate 304. In some implementations, the thermal pad 306 can be situated between the apparatus and the frame to serve as a thermal interface to facilitate removal of heat from a thermoelectric device. For example, the thermal pad 306 can have a similar or identical size as the plate 304.

Figure 4:
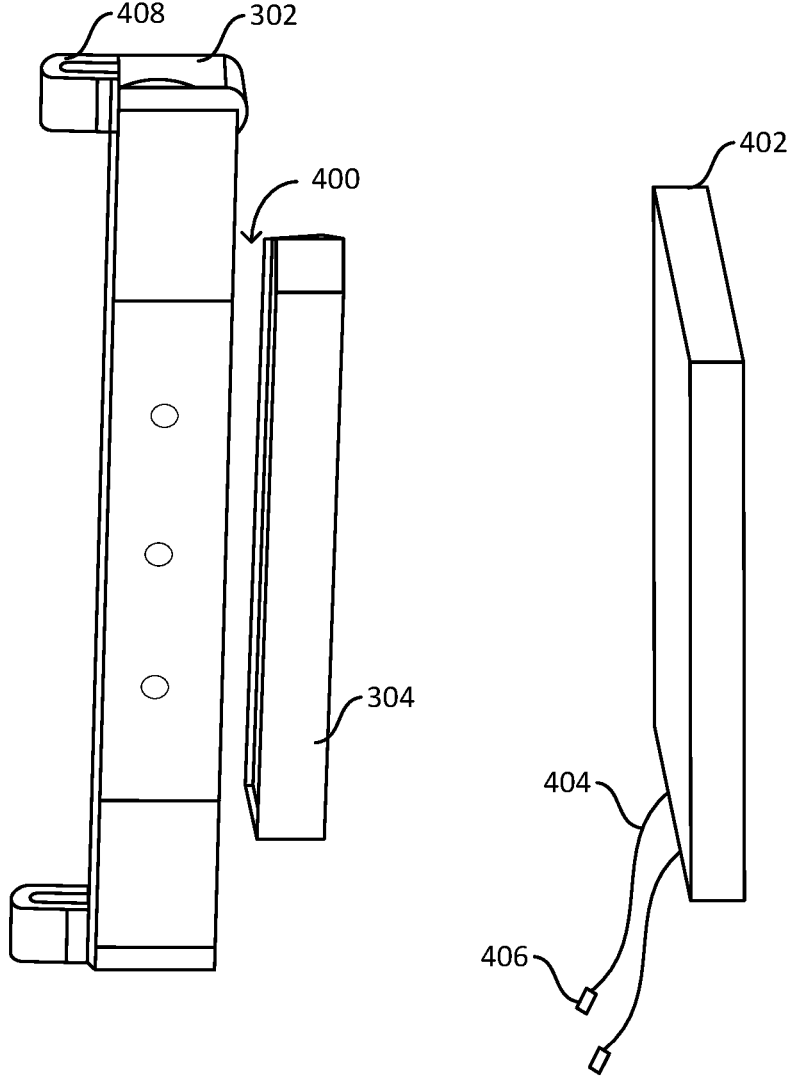
FIG. 4 shows an example side view of the fixture of FIG. 3.

FIG. 4 shows an example side view of the fixture 300 of FIG. 3. A gap 400 exists between the fixture bed 302 and the plate 304. A thermoelectric device 402 can be positioned in the gap 400. For example, this provides that the thermoelectric device 402 can be mounted to the clamshell. The thermoelectric device 402 can control a temperature of the electrochemical cell positioned in the clamshell. The thermoelectric device 402 can be controlled to provide cooling or heating of the electrochemical cell. In some implementations, the thermoelectric device 402 can include an electrified junction between two different conductors (e.g., a thermocouple). For example, the thermoelectric device 402 can operate according to the Peltier effect to either cool or heat the electrochemical cell. The thermoelectric device 402 can be powered or otherwise controlled by way of at least one wire 404. For example, a connector 406 of the wire 404 can electrically connect the thermoelectric device 402 to circuitry for controlling the thermal circumstances of the testing of the electrochemical cell. The clamshell (e.g., the clamshell 102 in FIG. 1) can provide sufficient thermal mass for thermal testing. There may be sufficient thermal flow to or from the thermoelectric device 402 which may be on one side of the clamshell.

The fixture bed 302 can include one or more bores 408. In some implementations, the bore(s) 408 can facilitate electrical connection to or from the electrochemical cell. For example, a contact (e.g., the contact 128 or 130 in FIG. 1) can be held by the bore 408.

Figure 5:
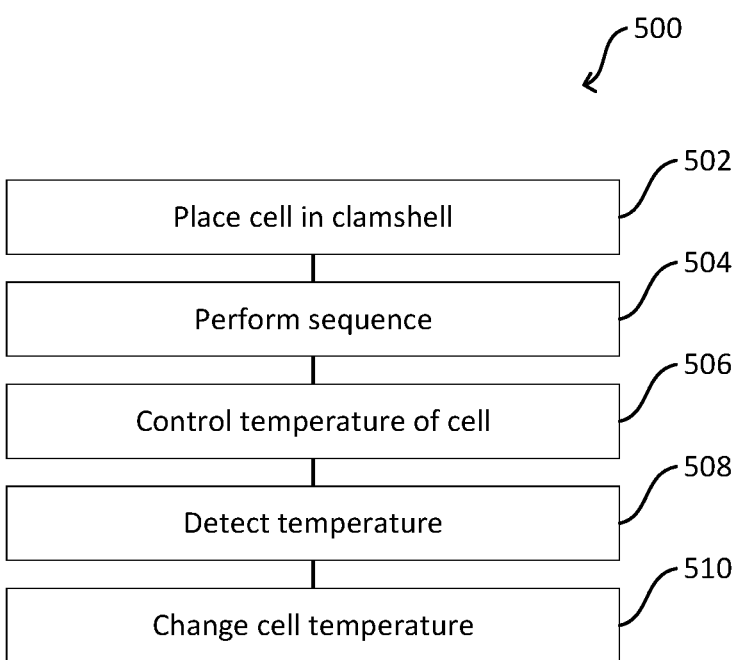
FIG. 5 shows a flowchart of an example of a method.

FIG. 5 shows a flowchart of an example of a method 500. The method 500 can be used with one or more other examples described elsewhere herein. More or fewer operations than shown can be performed. Two or more operations can be performed in a different order unless otherwise indicated.

Operation 502 can include placing an electrochemical cell in a clamshell (e.g., the clamshell 102 of FIG. 1). The electrochemical cell has first and second terminals. The clamshell comprises (i) at least first and second portions hinged to each other, and (ii) first and second contacts positioned for contacting the first and second terminals, respectively.

Operation 504 can include performing at least one of a charging sequence or a discharging sequence on the electrochemical cell in the clamshell. The sequence is performed while the electrochemical cell is in the clamshell.

Operation 506 can include, during the charging sequence or the discharging sequence, controlling a temperature of the electrochemical cell using a thermoelectric device mounted to the clamshell. For example, the thermoelectric device 402 (FIG. 4) can be used.

Operation 508 can include detecting a temperature inside at least one of the first and second portions of the clamshell using a PTC device (e.g., the PTC device 142 of FIG. 1). For example, the temperature can be a safety cutoff temperature and/or a testing temperature of the electrochemical cell.

Operation 510 can include changing the temperature of the electrochemical cell using the thermoelectric device based on detecting the temperature. For example, heat can be provided to, or removed from, the electrochemical cell based on the reading of the detected temperature.

Figure 6:
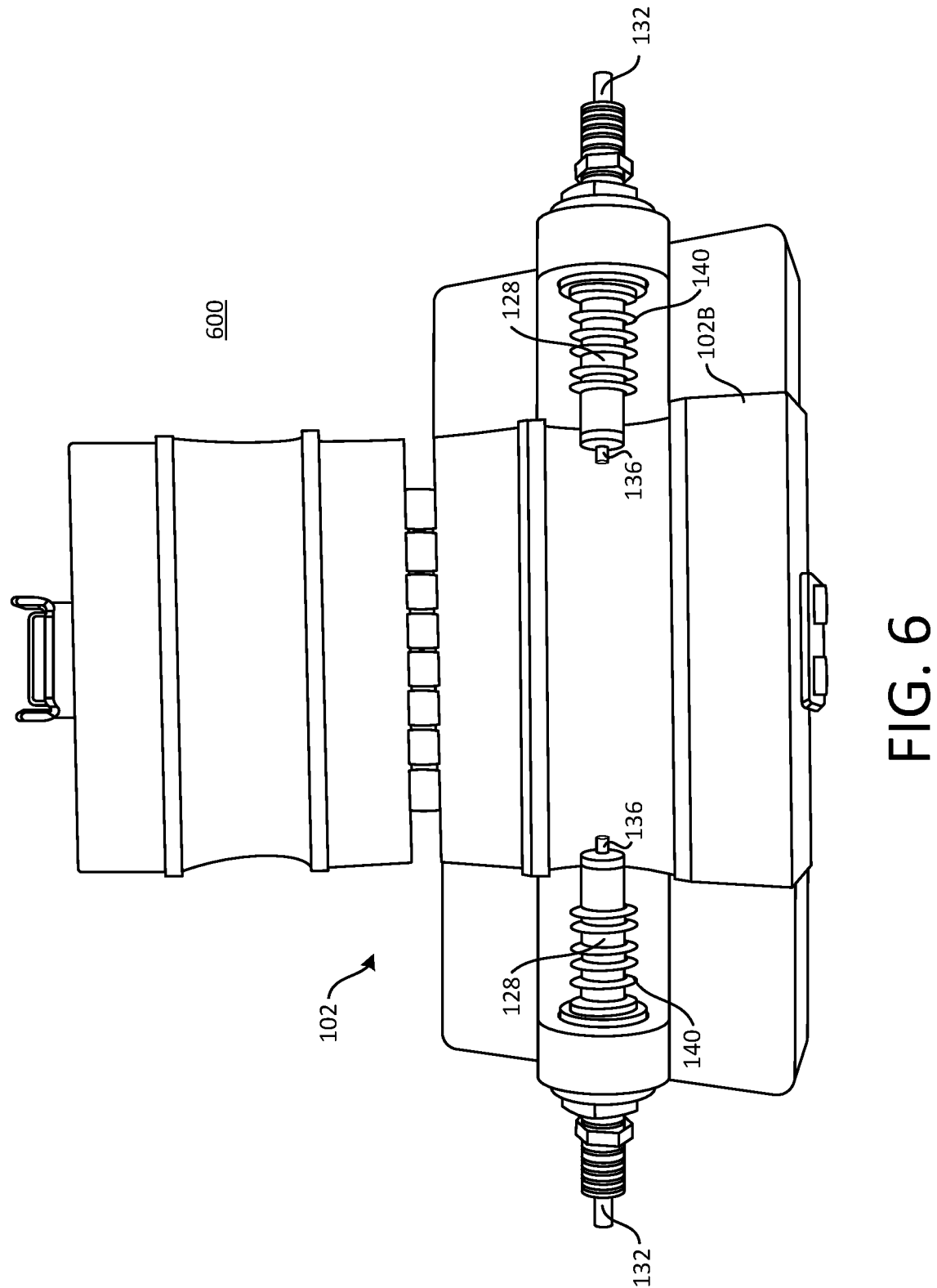
FIG. 6 schematically shows another example of an apparatus for controlling a temperature of an electrochemical cell.

FIG. 6 schematically shows another example of an apparatus 600 for controlling a temperature of an electrochemical cell. The apparatus 600 can be used with one or more other examples described elsewhere herein. The apparatus 600 includes some components identical or similar to those of the apparatus 100 in FIG. 1 which will not be described in detail here. In the apparatus 600, respective instances of the contact 128 and the terminal 132 can be used at both terminals (e.g., at both ends) of the electrochemical cell. For example, respective instances of the spring-loaded pin 136 and spring 140 can also be used at both terminals.

Figure 7:
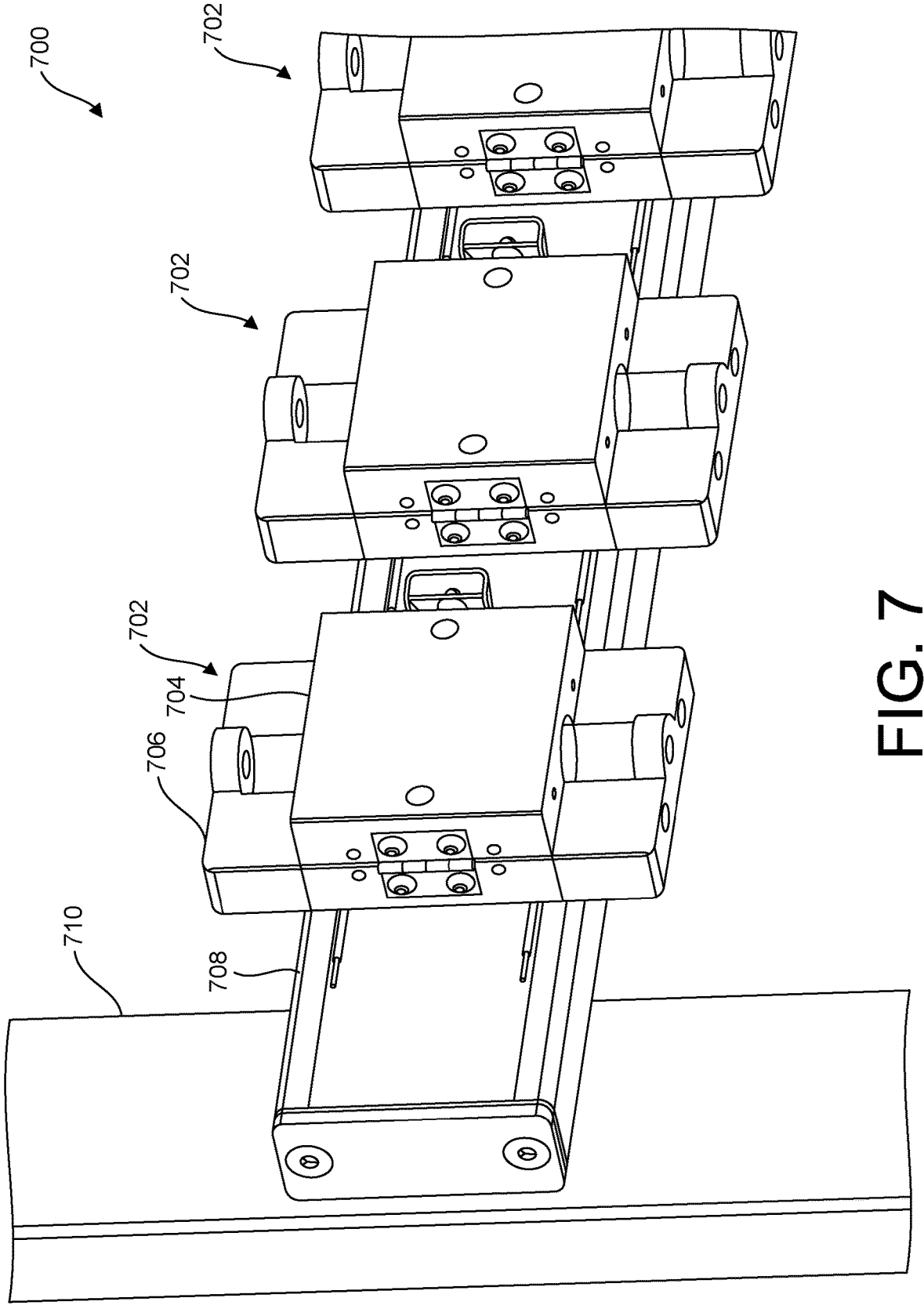
FIG. 7 shows another example of an apparatus for controlling a temperature of an electrochemical cell.
Figure 8:
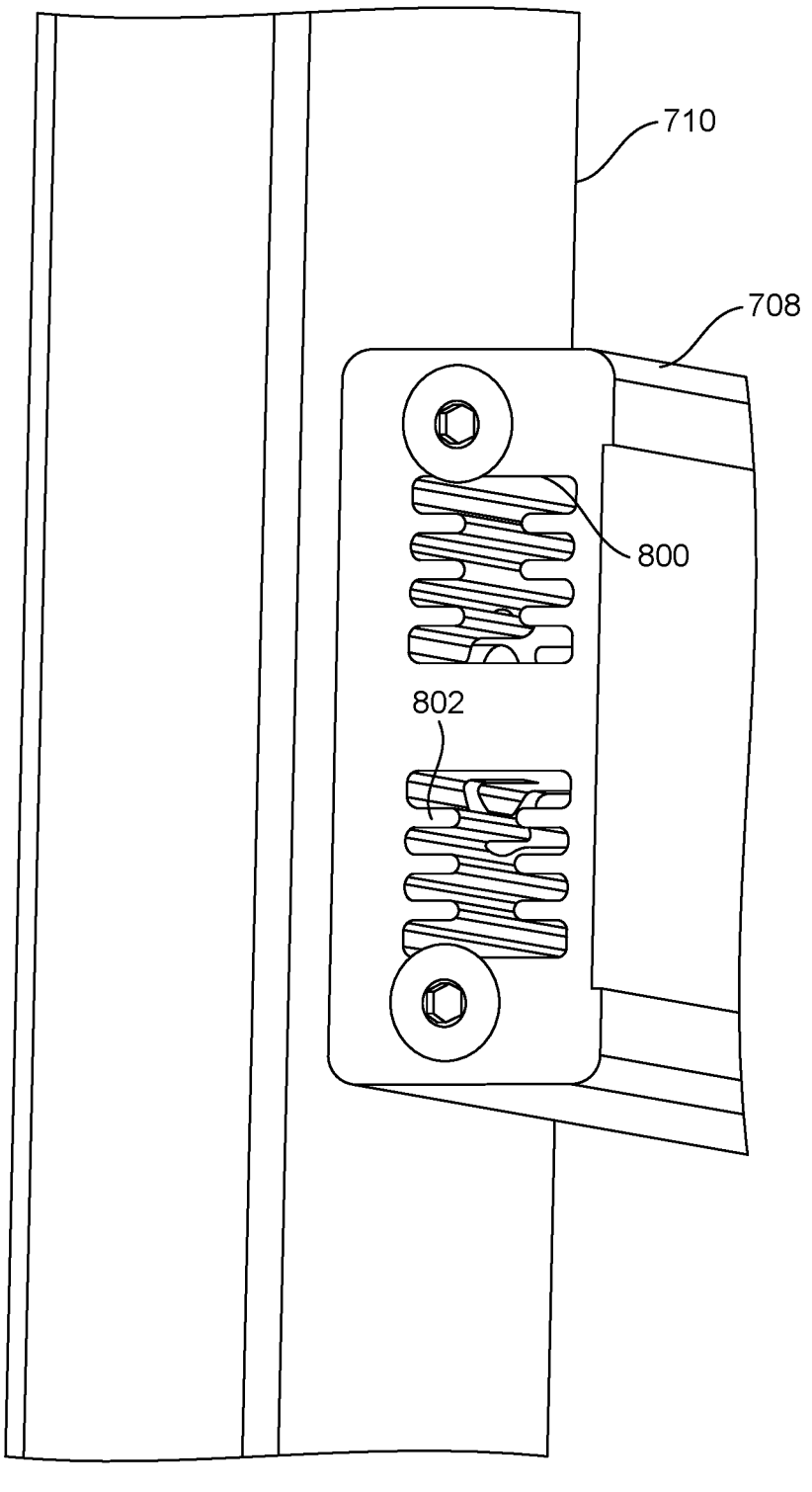
FIG. 8 shows a rear view of the apparatus of FIG. 7.

FIG. 7 shows another example of an apparatus 700 for controlling a temperature of an electrochemical cell. FIG. 8 shows an example cross section of the extrusion of FIG. 7. The apparatus 700 can be used with one or more other examples described elsewhere herein. Only a portion of the apparatus 700 is being shown for simplicity. For example, other portions of the apparatus 700 can be identical or similar to those shown.

The apparatus 700 includes multiple units 702. Each of the units 702 includes a clamshell 704 and a fixture 706. For example, the clamshell 704 can be identical or similar to the clamshell 102 in FIG. 1. As another example, the fixture 706 can be identical or similar to the fixture 104 in FIG. 1. The units 702 are mounted to an extrusion 708. A respective thermoelectric cooler (TEC) can be mounted between and abut each of the units 702 and the extrusion 708. In comparison to the fixture 300 of FIG. 3, the plate 304 can be omitted in the apparatus 700. For example, a thermoelectric device (e.g., the TEC) can abut (e.g., be sandwiched between) the extrusion 708 and the clamshell 704.

The extrusion 708 can be made by extruding metal (e.g., aluminum) into any of multiple profiles. The extrusion 708 has at least one interior channel 800 for coolant. The interior channel 800 can have any shape (including, but not limited to, a shape as shown, or a rectilinear shape, or a circular shape). For example, one or more fins 802 can face inward in the interior channel 800. The extrusion 708 can have any length.

The extrusion 708 can be mounted to at least one upright 710. The upright 710 can be made of metal (e.g., extruded aluminum) and has at least one interior channel for coolant. The interior channel of the upright 710 can have any shape. In some implementations, the interior channel of the upright 710 has a shape identical or similar to that of the interior channel 146 in FIG. 1. The upright 710 and the extrusion 708 can be part of a frame configured for accommodating multiple instances of the units 702.

Figure 9:
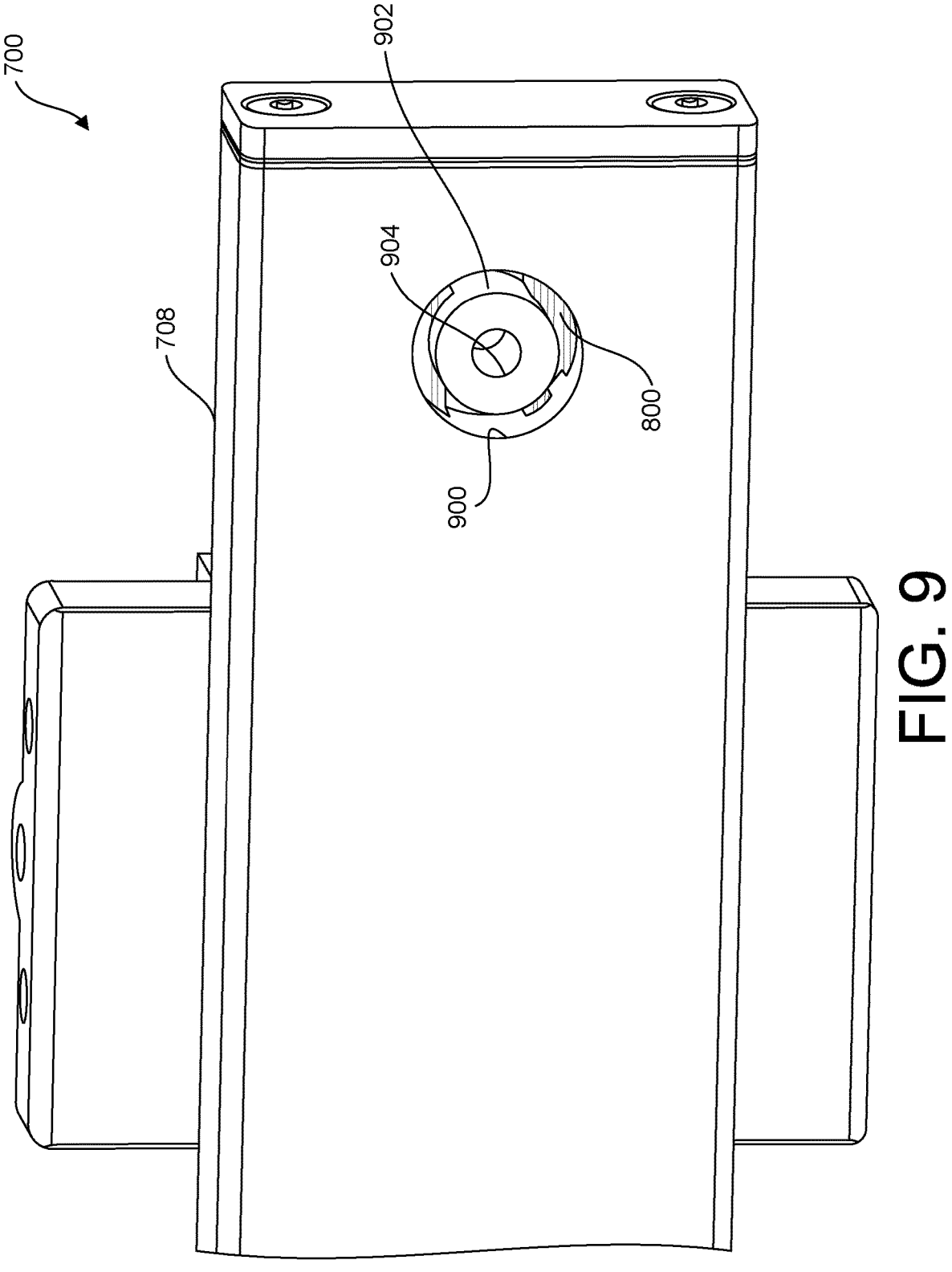
FIG. 9 shows an example of the riser of FIG. 7.
Figure 10:
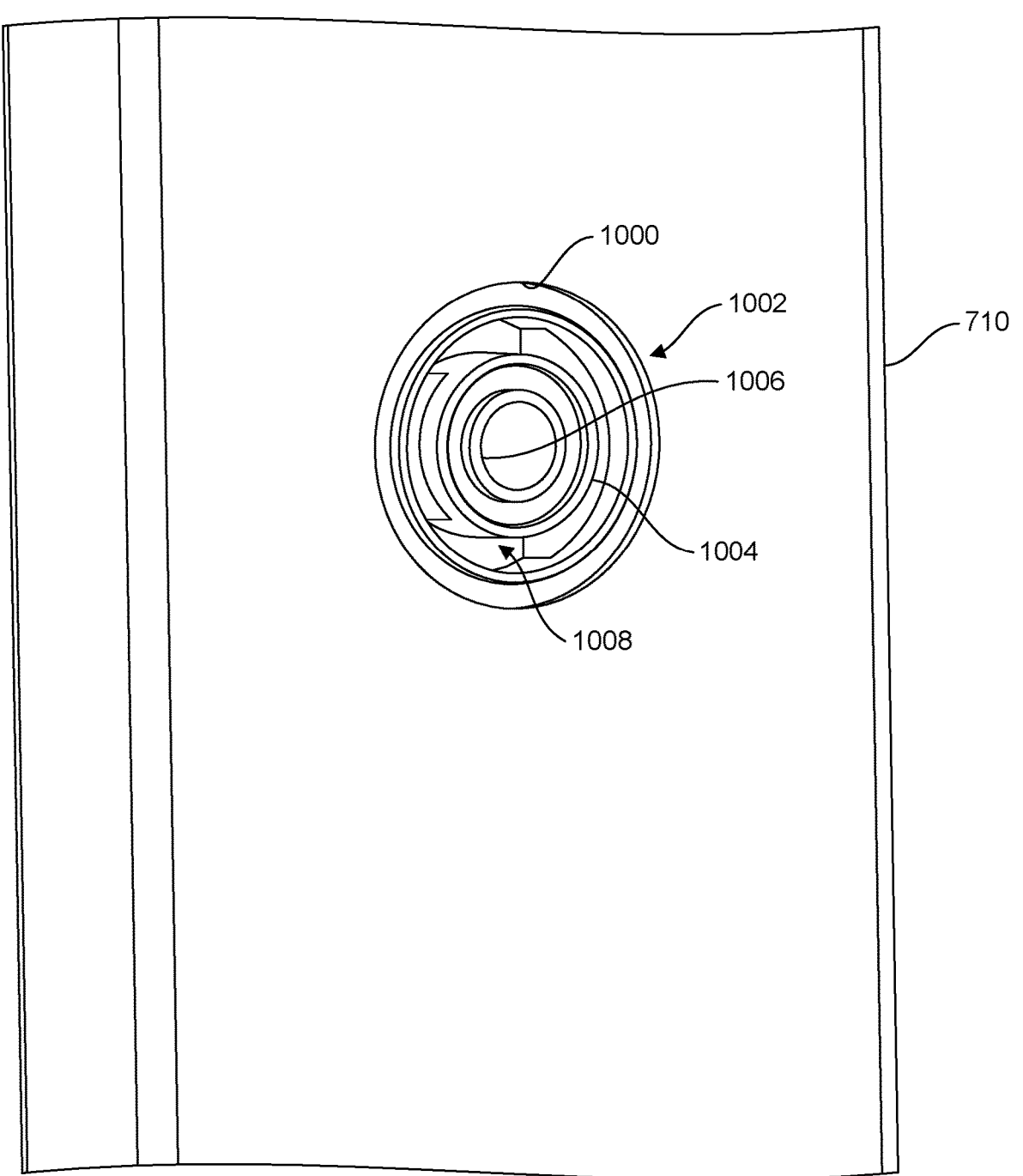
FIG. 10 shows an example cross section of the extrusion of FIG. 7.
Figure 11:
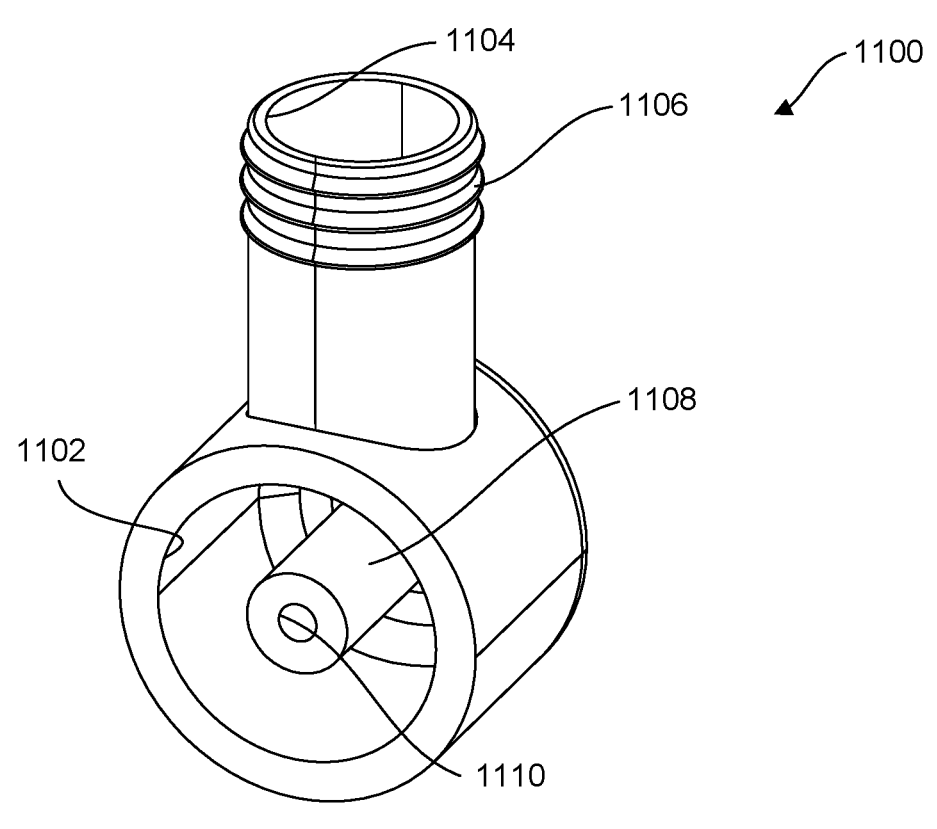
FIGS. 11-14 show examples of a fitting that can be mounted to a frame.
Figure 12:
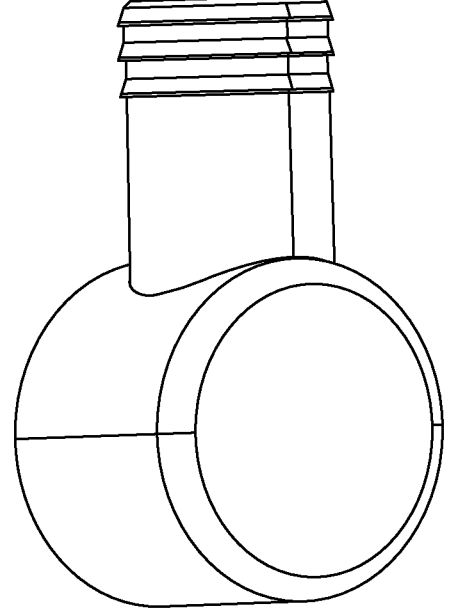
Figure 13:
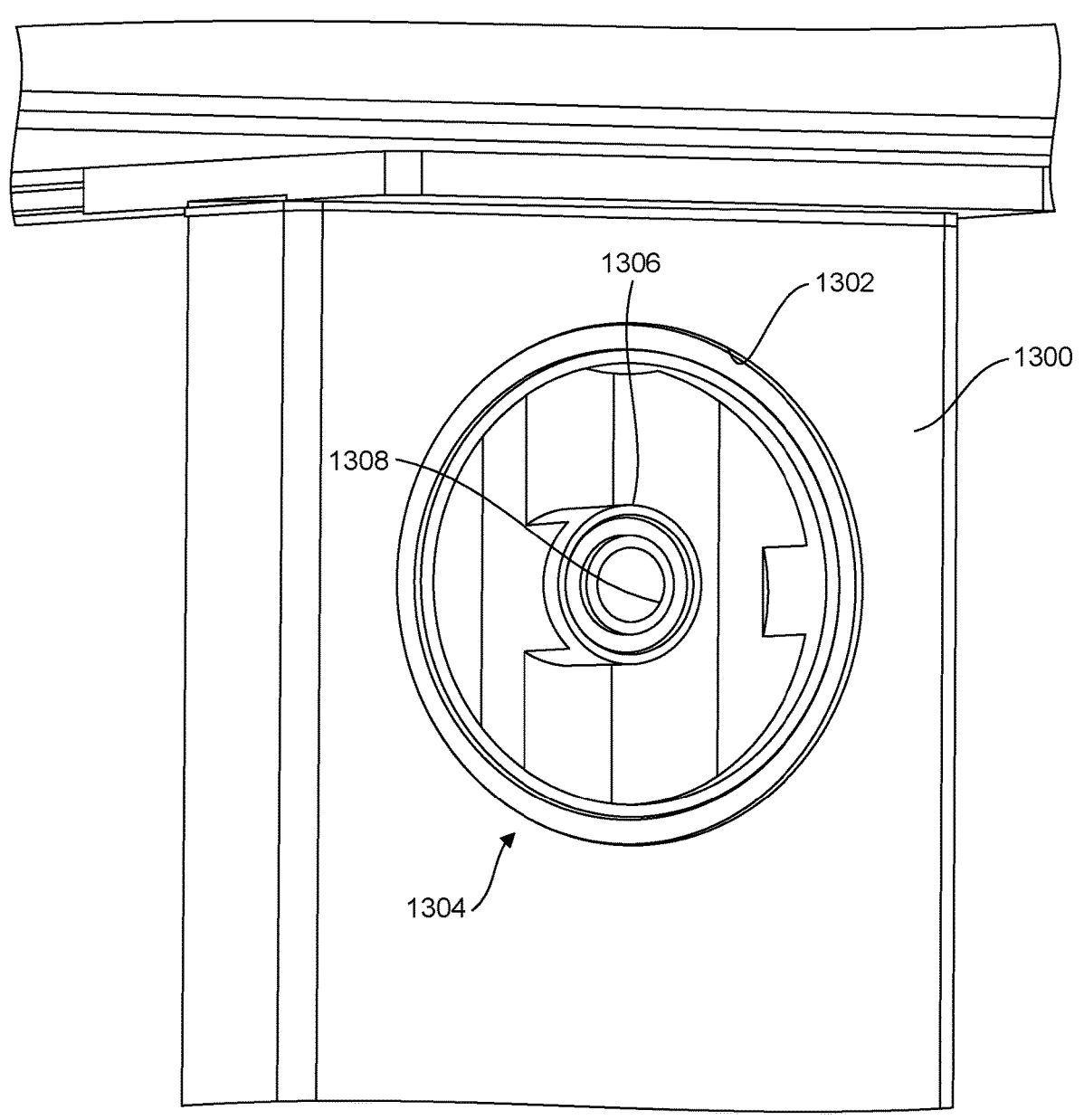
Figure 14:
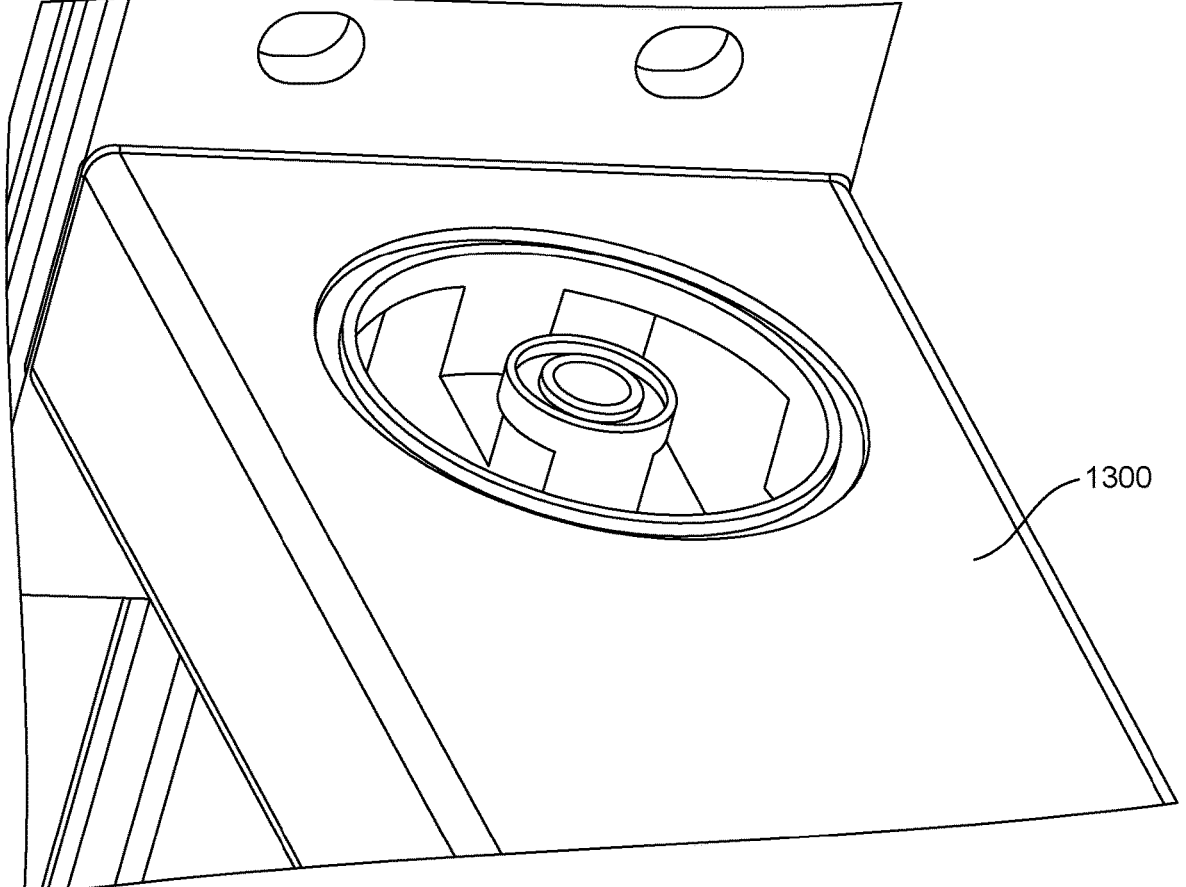

FIG. 9 shows a rear view of the apparatus 700 of FIG. 7. FIG. 10 shows an example of the upright 710 of FIG. 7. The extrusion 708 can have an opening 900 into the interior channel 800. The upright 710 can have an opening 1000 into the interior channel of the upright 710. The openings 900 and 1000 are aligned when the extrusion 708 is mounted to the upright 710 so as to form a coolant passage. Coolant can flow into or out of the extrusion 708 through the coolant passage. For example, one instance of the coolant passage can be situated at one end of the extrusion 708 where the extrusion 708 is mounted to one instance of the upright 710, and another instance of the coolant passage can be situated at an opposite end of the extrusion 708 where the extrusion 708 is mounted to another instance of the upright 710. Coolant from one of the uprights 710 can enter the extrusion 708, pass through its interior channel 800 and remove heat generated at the units 702, and exit the extrusion 708 into the other of the uprights 710. One or more of the instances of the uprights 710 can be coupled to one or more instances of the extrusion 708.

A coolant path member 902 can be provided at one of the openings 900 or 1000. Here, the coolant path member 902 is positioned within the opening 900. An O-ring fitting 1002 can be provided at the other one of the openings 900 or 1000. Here, the O-ring fitting 1002 is positioned within the opening 1000. The coolant path member 902 has a threaded hole 904. The O-ring fitting 1002 has one or more O-rings 1004. For example, the O-ring fitting 1002 can have two instances of the O-ring 1004. The O-ring fitting 1002 can have a through hole 1006. For example, the coolant path member 902 can fit into the O-ring fitting 1002 when the extrusion 708 is mounted to the upright 710. A bolt can pass through the upright 710, entering at the opposite side from where the extrusion 708 is to be mounted, and can extend through the through hole 1006. Threads of the bolt can engage with the threaded hole 904 to secure the upright 710 and the extrusion 708 to each other. Coolant can flow into or out of the extrusion 708 through a passage 1008 in the O-ring fitting 1002.

FIGS. 11-14 show examples of a fitting 1100 that can be mounted to a frame 1300. The fitting 1100 can be used with one or more other examples described elsewhere herein. The fitting 1100 can be mounted to the frame 144 in FIG. 1 and/or to the extrusion 708 in FIG. 7, to name just two examples. The fitting 1100 can be used for conveying coolant into and/or out of the frame 1300.

The fitting 1100 can have an opening 1102 into an interior space that also has an opening 1104. For example, the opening 1104 can be provided with a hose barb 1106. The frame 1300 can have an opening 1302 into the interior channel of the frame 1300. The openings 1102 and 1302 are aligned when the fitting 1100 is mounted to the frame 1300 so as to form a coolant passage. Coolant can flow into or out of the frame 1300 through the coolant passage. A coolant path member 1108 can be provided at one of the openings 1102 or 1302. Here, the coolant path member 1108 is positioned within the opening 1102. An O-ring fitting 1304 can be provided at the other one of the openings 1102 or 1302. Here, the O-ring fitting 1304 is positioned within the opening 1302. The fitting 1100 has a threaded hole 1110. The O-ring fitting 1304 has one or more O-rings 1306. For example, the O-ring fitting 1304 can have two instances of the O-ring 1306. The O-ring fitting 1304 can have a through hole 1308. For example, the coolant path member 1108 can fit into the O-ring fitting 1304 when the fitting 1100 is mounted to the frame 1300. A bolt can pass through the frame 1300, entering at the opposite side from where the fitting 1100 is to be mounted, and can extend through the through hole 1308. Threads of the bolt can engage with the threaded hole 1110 to secure the fitting 1100 and the frame 1300 to each other.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system comprising:
a frame having an interior channel for coolant; and
an apparatus mounted to the frame, the apparatus comprising:
  a clamshell configured for holding an electrochemical cell having first and second terminals, the clamshell comprising at least first and second portions hinged to each other;
  first and second contacts positioned for contacting the first and second terminals, respectively;
  a thermoelectric device mounted to the clamshell for controlling a temperature of the electrochemical cell;
  a fitting mounted to the frame that facilitates flow into or out of the frame, the fitting including a coolant path member configured to fit inside an O-ring fitting; and
  a positive thermal coefficient device positioned to detect temperature inside at least one of the first and second portions of the clamshell, wherein the positive thermal coefficient device is configured for detecting a safety cutoff temperature of the electrochemical cell.

2. The system of claim 1, further comprising a thermal pad positioned between the apparatus and the frame.

3. The system of claim 1, where the frame comprises an extrusion with an interior channel.

4. The system of claim 3, wherein at least one fin faces inward in the interior channel.

5. The system of claim 3, wherein the thermoelectric device is positioned between and abuts the clamshell and the extrusion.

6. The system of claim 3, wherein the frame further comprises an upright, wherein the extrusion is coupled to the upright, and wherein a coolant passage is formed between the extrusion and the upright, the coolant passage facilitating flow of coolant into and out of the interior channel of the extrusion.

7. The system of claim 1, wherein a form factor of the electrochemical cell is a cylinder shape or a prismatic shape.

8. The system of claim 1, wherein the thermoelectric device is configured for operating according to Peltier effect.

9. The system of claim 1, wherein at least one of the first and second contacts includes a spring-loaded pin, the spring-loaded pin configured to be moveable relative to a remainder of the one of the first and second contacts for electrically contacting a terminal of the electrochemical cell.

10. The system of claim 1, wherein at least one of the first and second contacts is spring mounted relative to the electrochemical cell such that the one of the first and second contacts is moveable relative to the electrochemical cell.

11. The system of claim 10, wherein both the first and second contacts are spring mounted relative to the electrochemical cell.

12. The system of claim 1, further comprising a thermal pad of a dielectric material inside the clamshell, the thermal pad facing the electrochemical cell.

13. The system of claim 12, further comprising a polymer film on a surface of the thermal pad, the polymer film positioned so that the electrochemical cell touches the polymer film, and does not touch the thermal pad, when positioned inside the clamshell.

14. The system of claim 1, further comprising a latch on the clamshell, the latch configured for selectively keeping the first and second portions of the clamshell in a closed position.

15. The system of claim 1, wherein the positive thermal coefficient device is further configured for detecting a testing temperature of the electrochemical cell.

16. The system of claim 1, wherein the coolant path member has a threaded hole.

17. The system of claim 1, wherein the O-ring fitting includes a passage for flow of coolant.

18. The system of claim 1, wherein the positive thermal coefficient device is configured to trigger a shutdown of testing equipment if the temperature of the electrochemical cell becomes too high.

* * * * *